April 27, 1954 J. R. DAVEY 2,677,016

TELETYPEWRITER TRUNK CIRCUIT

Filed June 9, 1951 2 Sheets-Sheet 1

INVENTOR
J.R.DAVEY
BY John E. Cassidy
ATTORNEY

April 27, 1954 J. R. DAVEY 2,677,016

TELETYPEWRITER TRUNK CIRCUIT

Filed June 9, 1951 2 Sheets-Sheet 2

INVENTOR
J. R. DAVEY
BY
John E. Cassidy
ATTORNEY

UNITED STATES PATENT OFFICE 2,677,016

TELETYPEWRITER TRUNK CIRCUIT

James R. Davey, Franklin Township, Somerset County, N. J., assignor to Bell Telephone Laboratories, Incorporated, New York, N. Y., a corporation of New York Application June 9, 1951, Serial No. 230,755

5 Claims. (Cl. 178—73)

This invention relates to telegraph systems and more particularly to a new type telegraph trunk circuit one end of which is arranged to operate on a potential basis, so that it may be connected to circuits which operate on a potential basis, and the other end of which is arranged to operate on a current basis, so that it may be connected to circuits which operate on a current basis. The end of the trunk which operates on a potential basis is arranged, in the present embodiment for termination in a telegraph service board which board has telegraph facilities arranged for telegraph hub repeater transmission and employing electronic controls therefor, which controls operate on a potential basis. Such facilities are well known in the art being described for instance in Patent 2,542,208, granted to M. R. Purvis, February 20, 1951, which is hereby made part of the present disclosure as though fully set forth herein.

An object of the invention is the improvement of telegraph systems. A more particular object of the invention is the provision of a telegraph trunk circuit arranged for cooperation with teletypewriter or telegraph cord circuits, monitoring cord circuits and other cord circuits which function on a potential rather than on a current basis.

The testing and maintenance facilities of telegraph switching centers which have telegraph lines and telegraph loops arranged for use in telegraph concentrations on a hub basis, are provided with various testing and communication cords specially arranged for cooperation with hub type telegraph repeaters. The service afforded by such facilities is now being extended so that they may be employed for testing telegraph circuits which are not themselves equipped with hub type telegraph repeaters with which the various telegraph cords in the service board are designed to cooperate. In order to do this it is necessary to provide means for arranging the non-hub type circuits so that they may be tested with circuits adapted to test hub type circuits.

As an example of such circuits, the automatic signaling master office trunk circuits which interconnect a satellite office, or concentrating unit as it is otherwise known, and a teletypewriter switching exchange may be cited. Teletypewriter concentrating units or satellite exchanges as they are sometimes called and such trunks are well known in the art. They are described for instance in Patent 2,223,279, granted to C. W. Lucek, January 14, 1941; Patent 2,340,599, granted to Kinkead-Lucek, February 1, 1944; and Patent 2,368,666, granted to J. A. Krecek, February 6, 1945, which are hereby made part of the present disclosure as though fully set forth herein. Such trunks are not equipped with hub type repeaters. It is desirable to arrange them so that they may be maintained and tested with the various cords employed in a telegraph service board which cords are designed to function with hub circuits.

In the present invention, as an example of the solution of this general problem, a special testing trunk circuit is employed which extends from a concentrating unit to a test position at a telegraph service board. The special trunk is arranged so that at one end it may be connected at the concentrating unit to the master signaling trunk which is to be tested, which master trunk operates on a current basis, and at the other end it may be connected, in the testing position of a hub type telegraph service board, to the various cord circuits employed in testing which are intended primarily to function with hub repeater circuits having hubs which operate on a potential rather than on a current basis.

The present trunk is arranged therefore to operate through one end on a current basis and through the other end on a potential basis.

The master trunk interconnecting a concentration unit or satellite office and a master office which is extended by means of the present trunk to the hub type testing facilities, it is emphasized, is cited only by way of example and it is to be understood that the present invention will afford means whereby telegraph circuits which operate on a current rather than on a potential basis may be tested by testing circuits which operate on a potential basis.

The invention may be understood from the following description when read with reference to the associated drawings. It is to be understood that the invention may be incorporated in other embodiments than that in which it is presently shown which is a preferred embodiment of the invention.

Figure 2:
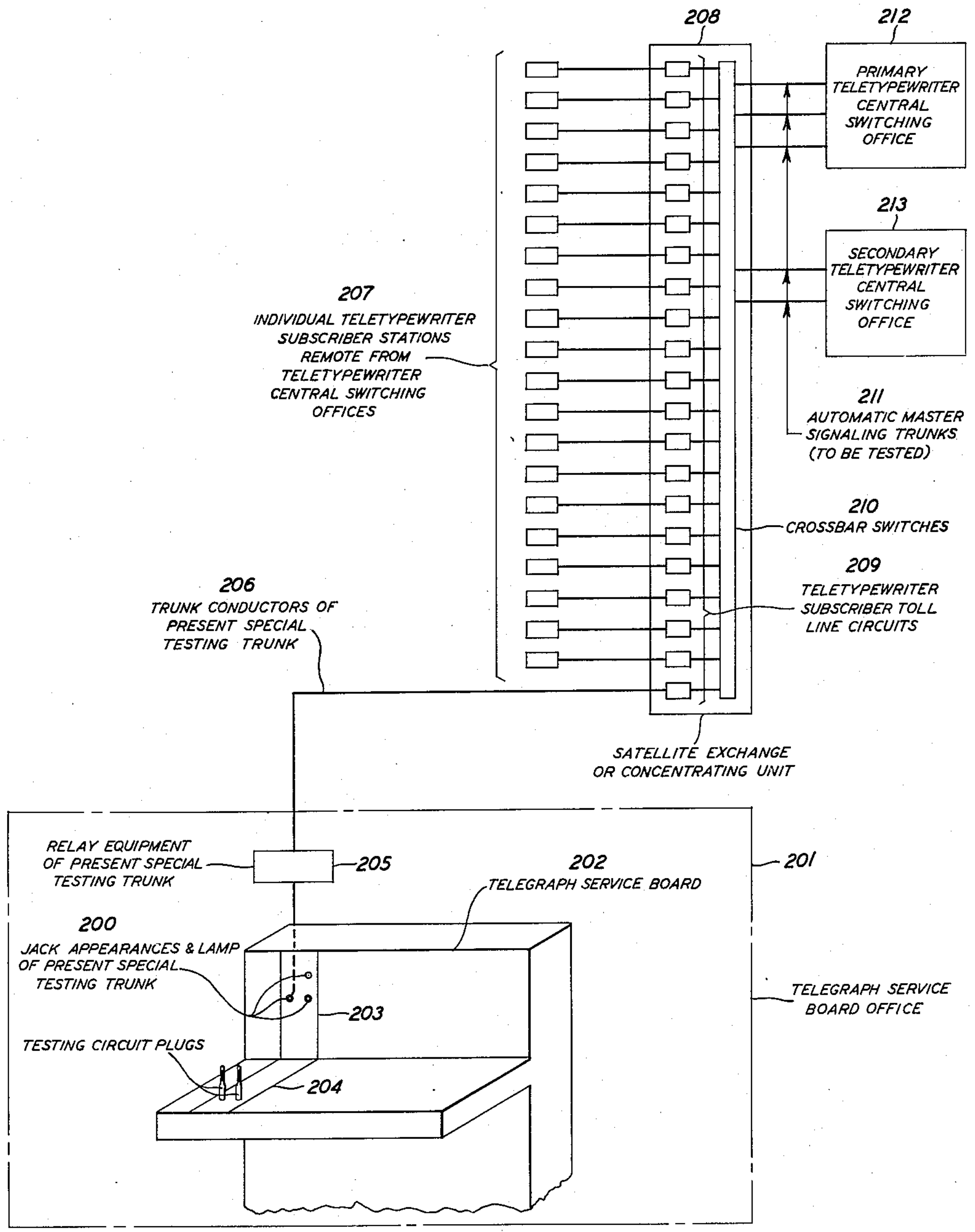
Fig. 2 is a diagram used in explaining the invention.

Refer now to Fig. 2. Fig. 2 shows diagrammatically by captioned rectangles the relationship of the present special testing trunk circuit to other circuits well known in the art, when the invention is incorporated in the present special testing trunk circuit and employed in connecting an automatic signaling trunk to a test board for testing and communication for maintenance purposes. It is emphasized that the invention consists in a trunk circuit having one end arranged to operate on a potential basis and the other end arranged to operate on a current basis. The invention may be applied in any service where it is desirable to interconnect a circuit which operates on a potential basis with one which operates on a current basis and a trunk is required to interconnect the two. In the present embodiment of the special trunk, the trunk serves as a link between testing and communication circuits at a test position in a telegraph service board and another trunk which is to be tested. The trunk which is to be tested is a trunk which is employed to interconnect a concentrating unit known also as a satellite office and a teletypewriter switching central office.

In Fig. 2, the rectangle 201 represents the telegraph service board office in which there is a telegraph service board 202, having a test position 203. At the test position there are testing circuits which may be terminated in plugs such as 204. Up to the present time all of the circuits which are tested at the service board operate on a potential basis and the testing circuits such as 204 are designed to cooperate with such circuits.

A satellite exhange or concentrating unit, if it is to be feasible economically, is generally unattended. It is desirable to be able to test the facilities which terminate at the satellite exchange from a remote testing position to save sending a test man regularly to the satellite exchange. The difficulty in the way of testing the automatic trunks, which connect the satellite exchange to the central teletypewriter switching office, with the testing facilities in the test position at the telegraph service board is that the testing facilities at the service board are arranged to test circuits which operate on a potential basis, whereas the automatic trunks operate on a current basis. This difficulty is obviated by the present invention which affords a trunk having the service board end arranged to cooperate with testing and communication circuits which function on a potential basis and the remote end which connects to the automatic trunks at the satellite exhange arranged to interconnect with circuits which function on a current basis.

Figure 1:
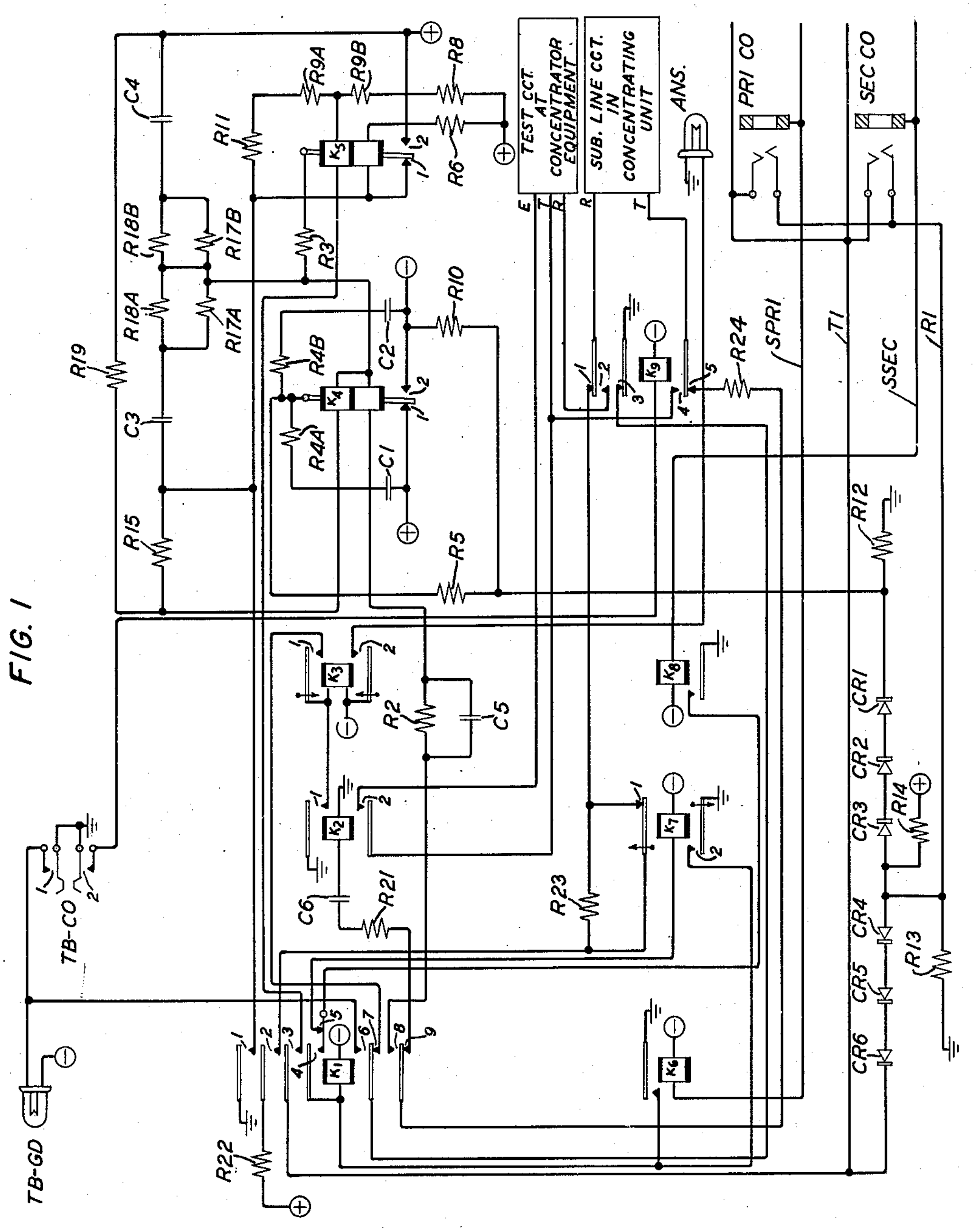
Fig. 1 shows the special testing trunk of the present invention.

The jacks of the present trunk designated in Fig. 1 as PRI CO and SEC CO and the lamp ANS appear at the test position 203 and are indicated as a group 200. They are shown connected to the trunk relay equipment 205 which is connected to the satellite exchange or concentrating unit by means of a group of conductors indicated by conductor 206.

As usually arranged a number of teletypewriter subscriber stations 207 remote from the nearest teletypewriter central switching office are connected to a satellite exchange 208, where each terminates in individual relay and other equipment 209 called a subscriber line circuit, or a subscriber toll line circuit when the distance from the satellite office to the subscriber station is long, which is frequently the case. At the satellite exchange are crossbar switches 210 which serve to interconnect the subscriber lines and the automatic master signaling trunks 211 which extend to the primary and secondary teletypewriter central switching office 212 and 213, respectively.

At the satellite exchange, one of the subscriber line circuits 209, which as explained constitutes relay and other equipment, identical with that employed at the satellite exchange to connect a subscriber station to a crossbar switch which extends the path to an automatic master signaling trunk, is employed to connect the special trunk of the present invention to a crossbar switch and to the automatic master signaling trunk. The rectangle in Fig. 1 designated test circuit at concentrator equipment comprises jacks and wiring which afford a test man access to the present trunk for testing the present trunk from the satellite exchange on such occasions as it may be necessary for a test man to visit the satellite office. This equipment may be considered as part of the subscriber line circuit. It corresponds to jacks 610 and 611 and the associated wiring shown in Fig. 6 of Patent 2,340,599.

All of the equipment indicated in Fig. 2 herein is well known in the art except the present special testing trunk, comprising the jacks and lamp 204, the relay equipment 205 and the conductors 206. The known equipment is described in detail in the four patents listed in the foregoing.

To amplify the foregoing somewhat, as an aid in understanding the relationship of the present special testing trunk of the invention to the circuits, known in the art, with which it cooperates, in the operation of telegraph satellite systems, or concentrating systems, a number of teletypewriter switching subscribers too remote from a central teletypewriter switching exchange to be connected thereto economically, because of the original and maintenance expense of the long circuits which would be required, are connected to a small automatic switching center and a relatively small group of trunks interconnecting the automatic switching center to the central teletypewriter switching exchange are employed to provide service for a larger number of subscribers. For instance twenty teletypewriter subscribers to the east of Garden City, New York, instead of being connected individually, each by a separate circuit, to a teletypewriter switching exchange in New York may be connected to a small automatic exchange in Garden City which in turn will be connected by means of a small group, such as five, automatic trunks, called master signaling trunks, to New York. The automatic Garden City office is called a satellite office or concentrating unit. Such satellite installations are generally fully automatic. To be feasible it is necessary that the equipment in the Garden City exchange be tested regularly to detect and preferably to anticipate trouble. In order to do this, testing will be provided through a testing trunk which connects to a test position at a telegraph service board at a nearby telegraph switching office. In one large modern telegraph system the test board is required to test large numbers of circuits which are arranged to be interconnected into private wire systems. In many telegraph offices, private wire systems, as distinguished from teletypewriter switching systems, are interconnected through hubs and in the more recently developed hub circuits the operation is on a potential rather than on a current basis. In many modern telegraph offices all of the telegraph lines are connected through a telegraph service board. They are all equipped with so-called hub repeater control circuits more recently termed coupling units. As thus arranged any telegraph line coming into a telegraph office may, if desired, be connected to a group of other lines similarly equipped through a telegraph hub into a private line network to serve say a particular single corporation. The modern hubs operate on a potential basis. In order that telegraph lines or telegraph loops arranged for interconnection through hubs which operate on a potential basis may be tested, it is necessary to provide special communication and testing circuits which operate also on a potential basis. The automatic trunks interconnecting a concentration unit to a teletypewriter central switching station, as mentioned, operate on a current basis. If the adjacent testing facility, to which they are to be connected for testing and maintenance, operates on a potential basis, it is required that some special means be provided so that the current trunks be testable with the potential testing circuits.

In the present invention a special trunk is provided. It is connected from a test position at an electronic hub type service board which operates on a potential basis to the satellite or concentrating unit as it is called. It is arranged so that at its end which terminates in the satellite exchange it is connectable to any of the five trunks mentioned in the foregoing which are known in the art as master signaling trunks, and which, as mentioned, extend from the satellite apparatus to the central teletypewriter exchange. The trunk to the central exchange operates on a current basis. The test position circuits operate on a potential basis. The trunk operates on the portion connected directly to the satellite end on a current basis and on the portion connected directly to the service board end on a potential basis.

The satellite switching apparatus as mentioned is mechanical. The present trunk incoming to the satellite exchange in certain respects may be considered to resemble a circuit incoming to the satellite exchange from a subscriber teletypewriter station. In normal operation the teletypewriter subscriber dials pulses and in response to this is connected through the satellite apparatus to the central teletypewriter exchange. The present trunk incoming from the service board testing position terminates at the satellite exchange in the same manner as does a subscriber loop. At the service board testing position the trunk is manually operated. In the present embodiment it terminates at the service board testing position in a jack. The test man at the service board testing position connects a communication or testing circuit to the jack termination of the present trunk. In response to this the present trunk is connected through the mechanical switching apparatus at the satellite office to the automatic signaling master office trunk which extends to the master teletypewriter switching office.

In modern satellite systems ordinarily there will be provided trunks from the satellite office to more than one central teletypewriter exchange so that an alternate route is available if another is busy. In the present trunk, arrangements are afforded whereby connections may be made over master trunks to more than one central teletypewriter exchange.

The circuit shown in the drawing, Fig. 1, and in its relationship to circuits known in the art in Fig. 2, provides, at the satellite apparatus, the equivalent of a subscriber appearance, which permits the attendant at the telegraph service board to make tests of the automatic signaling master office trunks extending to a teletypewriter switching exchange.

By means of directing pulses sent out from the master central teletypewriter switching exchange over the automatic signaling master office trunk to the satellite apparatus, the master trunk may be extended through the present trunk to a test position at a service board.

First to consider the functions generally:

The automatic signaling master office trunk is connected at the satellite exchange to the present circuit by way of the automatic switching equipment at the satellite exchange in response to the proper call directing pulses transmitted from the teletypewriter exchange end.

Ringing signals incoming over the present trunk to the telegraph service board termination cause the answering lamp ANS at the service board to light.

A call is answered at the local test position of the service board by connecting a teletypewriter cord circuit to the primary central office jack PRI CO. The answering lamp ANS is thereupon extinguished.

Disconnection at the distant end causes the service board attendant's teletypewriter connected to the teletypewriter cord circuit, at the test position at the telegraph service board, to run open as an indication of the distant disconnection.

Disconnection of the teletypewriter cord circuit from the present trunk, at the test position at the telegraph service board restores the present trunk to its normal unoperated condition.

A call outgoing from the test position of the telegraph service board over the present trunk is originated by plugging the jack of the teletypewriter cord circuit into jack PRI CO for calling over the present trunk through the satellite office for connection on an automatic signaling master office trunk to the primary central office or by plugging into the secondary central office jack SEC CO for calling over the present trunk through the satellite office for connection on an automatic signaling master office trunk to the alternate central office switching point.

A recall is made by disconnecting from either trunk jack, at the test position in the telegraph service board, for two seconds and then replugging.

*Incoming call*

The present trunk circuit connects to the automatic equipment at the concentrating unit or satellite exchange like a subscriber loop. Calls for the present trunk come to the concentrating unit over an automatic signaling master office trunk.

The master office trunk at the master teletypewriter switching office extends through a test board thereat before it terminates at the teletypewriter switchboard thereat and calls incoming over the present trunk to the service board test position may be originated at either the switchboard at the master office or at the test board thereat. It is possible also to employ the present trunk for a local connection from a jack circuit in the concentration jack circuit of the service board.

In either case proper call directing pulses will cause the concentrating unit to connect the automatic signaling master office trunk terminating circuit to this trunk. Ringing current may be applied to the present trunk automatically or may be started by the originating operator or attendant depending upon the traffic arrangement. The ringing current incoming through the subscriber line circuit in the concentrating unit passes through the tip conductor T through contact 5 of relay K9, resistance R24, contact 9 of relay K1, resistance R21, condenser C6 and the winding of relay K2 to ground, operating relay K2. The operation of relay K2 in turn operates relay K3 over a circuit from ground through contact 1 of relay K2 and the winding of relay K3 to battery. Relay K3 operated locks over a circuit from battery through the winding and contact 1 of relay K3, contact 7 of relay K1, and contact 3 of relay K9 to ground. The operation of relay K3 also establishes a circuit from battery through contact 2 of relay K3 and the filament of answering lamp ANS to ground lighting the answering lamp.

*Answering the call*

The call is answered by connecting the teletypewriter cord circuit per Fig. 4 of Patent 2,542,208, mentioned in the foregoing, to jack PRI CO. In response to this a circuit is established from ground on the sleeve of the connecting cord through a resistance in the sleeve of the cord, the sleeve of jack PRI CO and the winding of relay K6 to battery operating relay K6. The operation of relay K6 in turn establishes a circuit from ground through the contact of relay K6 and the winding of relay K1 to battery operating relay K1. The operation of relay K1 establishes a number of circuits as follows:

It closes the tip of the circuit T from the subscriber line circuit in the concentrating unit, shown for instance in Patent 2,368,666, mentioned in the foregoing, through contact 5 of relay K9, resistance R24, contact 8 of relay K1, resistance R2 in shunt with capacitance C5, bottom winding of relay K4, resistance R3, armature and marking contact 1 of relay K5 and contact 1 of relay K1 to ground. The operation of relay K1 also establishes a circuit from the ring conductor R of the subscriber line circuit in the concentrating unit, through contact 1 of relay K9, contact 1 of relay K7 which when closed short-circuits resistance R23, contact 2 of relay K1 and resistance R22 to positive battery to perform a supervisory function. The operation of relay K1 also completes the transmission circuits of relays K4 and K5, which will become apparent hereinafter.

The operation of relay K1 by opening its contact 7 opens the locking path of relay K3 which releases, extinguishing the answering lamp ANS. The operation of relay K1 also performs other functions which avail nothing at this time.

Transmission is effected between the tip conductor T of the subscriber line circuit and the teletypewriter cord circuit connected to jack PRI CO through the conversion repeater consisting of relays K4 and K5 and the associated resistances and condensers.

Where the magnitudes of constants are cited in the following it is to be understood that the cited values are by way of example to facilitate an understanding of the invention but the operation of the circuit is not limited to elements of the cited magnitudes.

Transmission on the concentrating unit side of the repeater is on a 0–20 milliampere balanced loop basis and transmission on the service board side is on a hub basis with positive 60 volts for marking and negative 30 volts for spacing. The connected teletypewriter cord circuit receives signals on the ring R1 and sends on the tip T1 which conductors are multipled to both jacks PRI CO and SEC CO.

First to consider the operation of relay K5, which controls the transmission of signals originating in the connected teletypewriter cord circuit and from the armature and contacts of which relay the repeated signals are transmitted to the concentrating unit.

For the marking condition the tip conductor T1 is open in the connected cord circuit at the anode of a first or sending space discharge device in the tip circuit of the connected cord. A circuit may be traced from the tip of the jack PRI CO and SEC CO in parallel through conductor T1 to parallel branches. One branch extends through contact 3 of relay K1 to the left-hand terminal of the top or operating winding of relay K5 and then through the winding to the junction between resistances R9A and R9B in the potentiometer which may be traced from positive battery through resistances R8, R9B, R9A, R11 and contact 1 of relay K1 to ground. The other parallel branch may be traced through rectifiers CR6, CR5 and CR4 to the junction between resistors R13 and R14 in another potentiometer, the circuit for which may be traced from positive 130-volt battery through resistances R14 and R13 to ground. For this condition the potential at the junction between resistances R9A and R9B is positive 60 volts and the potential of the junction between resistances R13 and R14 is also positive 60 volts so that no current flows through the top or operating winding of relay K5 for the marking condition. Relay K5 is equipped with a biasing circuit which may be traced from positive battery through resistance R6, lower winding of relay K5 and contact 1 of relay K1 to ground. The current in the biasing winding remains constant at 10 milliamperes and its effect tends to actuate the armature of relay K1 constantly toward its marking contact. During the marking condition of the transmitting side of the connected cord circuit therefore the armature of relay K5 will be maintained in engagement with its left-hand or marking contact 1. For a spacing signal from the connected cord the first or sending space discharge device in the cord is activated and a current of 30 milliamperes flows through the device from the present trunk. Of this current 20 milliamperes flow from the potentiometer comprising resistances R8, R9A, R9B and R11 through the top winding of relay K5. The potential of the junction between resistances R9A and R9B as a result of this falls to negative 30 volts. The current through the top winding of relay K5 is in such a direction that its effect tends to activate the armature of relay K5 to engage with its right-hand or spacing contact and this effect is dominant over the biasing effect, so that the armature of relay K5 is actuated to engage its spacing contact. As a result of the conduction of the space discharge device in the tip circuit of the connecting cord through conductor T1, 10 milliamperes flow from the junction between resistances R13 and R14 through rectifiers CR4, CR5 and CR6. The potential of the junction of resistors R13 and R14 falls to negative 30 volts for this spacing condition.

When the armature of relay K5 is in engagement with its marking contact, ground is connected from contact 1 of relay K1, contact 1 and armature of relay K5 and resistor R3 to parallel branches at the apex of relay K4. One branch extends through the bottom or operating winding of relay K4, resistance R2 shunted by capacitance C5, contact 8 of relay K1, resistor R24, contact 5 of relay K9, conductor T and the armature and marking contact of the sending relay in the connected subscriber line circuit in the concentrating unit to positive 130-volt battery. A current of 20 milliamperes flows through the bottom or operating winding of relay K4 for this condition in such a direction that its effect tends to actuate its armature to engage its left-hand or marking contact. A path may also be traced from the apex of relay K4 through its upper or biasing winding to the junction of resistors R15 and R19 in a potentiometer circuit which may be traced from positive battery through resistors R19, R15 and contact 1 of relay K1 to ground. The open circuit potential of the junction of resistances R19 and R15 is positive 65 volts. A current of 10 milliamperes flows in the biasing circuit in a direction from left to right and its effect tends to actuate the armature of relay K4 to engage its right-hand or spacing contact. For the marking condition the effect of the current in the bottom or operating winding is dominant and the armature of relay K4 is maintained in engagement with its left-hand or marking contact 1. When the armature of relay K5 is actuated to engage its spacing contact, positive 130-volt battery is connected to the apex of relay K4. No current flows therefore in the bottom or operating winding of relay K4 since both ends of the circuit terminate in battery of the same polarity and magnitude. Current flows from positive 130 volts to positive 65 volts in a direction from right to left through the biasing winding of relay K4 and its effect now tends to actuate the armature of relay K4 toward its marking contact and since the effect is unopposed the armature of relay K4 will be maintained in engagement with its marking contact. Thus signals may be transmitted from the contacts of relay K5 to the concentrating unit while the armature of relay K4 remains on its marking contact.

The potentiometer formed by resistors R13 and R14 has a potential of positive 60 volts for the marking condition which is impressed through the ring conductor R1 on the ring of jacks PRI CO and SEC CO in parallel to produce a marking condition in the connected cord. The potentiometer formed by resistors R8, R9B, R9A and R11 produces a positive 60-volt potential on the tip T1 of the connected cord for marking.

When a spacing signal is transmitted from the connected cord as explained previously 10 milliamperes flow from the junction of resistances R13 and R14. This changes the potential of the junction between these resistances from positive 60 volts to negative 30 volts. The ring circuit R1 of the jacks PRI CO or SEC CO is connected to the grid of a second or receiving space discharge device in the ring circuit of the connected cord. This device is maintained conducting for the positive 60-volt marking potential and is cut off for the negative 30-volt spacing potential at the junction between resistances R13 and R14. In response to this a teletypewriter receiving magnet in the output of the receiving space discharge device connected to the receiving or ring circuit of the cord receives a home copy of the signals transmitted on the sending side of the connected cord, the signals being transmitted back from the potentiometer in the conversion repeater of the trunk circuit. This is an important feature of the invention.

A spacing signal from the concentrator results from the connection of the armature of the sending relay in the concentrator to ground which is impressed on the left-hand terminal of the bottom or operating winding of relay K4. Since ground is connected also in the trunk to the opposite right-hand terminal of the winding through contact 1 of relay K1, there is no current in the operating winding of relay K4. The effect of the current in the upper or biasing winding of relay K4 which is tending to actuate its armature to its spacing contact will be unchanged and since it is now unopposed it will be effective to actuate the armature of relay K4 to its right-hand or spacing contact.

A circuit may be traced from negative 130-volt battery through resistors R10 and R12 to ground. For the marking condition of relay K4 a circuit may be traced from positive 130-volt battery through the armature and left-hand or marking contact 1 of relay K4 and resistor R5 to the junction of resistors R10 and R12. This junction is connected through rectifiers CR1, CR2 and CR3 to the junction between resistors R13 and R14. For the marking condition the junction between resistors R5, R10 and R12 is positive 65 volts and the junction between resistors R14 and R13 is positive 60 volts. Non-linear resistors CR1, CR2 and CR3 are connected so that for this condition their resistance is very high. For the spacing condition of relay K4 with negative 130 volts connected through its right-hand contact 2 to its armature, however, the potential of the junction of resistors R10 and R12 becomes negative. In response to this a 10-milliampere current flows through non-linear resistors CR1, CR2 and CR3 and the potential of the junction of resistors R13 and R14 falls to negative 30 volts. This repeats the incoming spacing signal over the ring conductor R1 into the ring of the cord. While conductor R1 is at the spacing value of −30 volts conductor T1 remains at the marking value of +60 volts and resistors CR4, CR5 and CR6 are high resistance thus isolating conductors R1 and T1. Thus current-no-current signals are transmitted from the concentration unit and reproduced as potential signals on the receiving end of the trunk.

*Disconnection at the distant end*

Disconnection at the distant end or at the intermediate test point will cause a spacing signal to be received by the trunk which when transmitted through the connected cord will cause the attendant's teletypewriter to run open.

*Disconnection of cord from trunk*

Disconnection of the cord from the trunk opens the path through the winding of relay K6 releasing the relay which in turn releases relay K1. This in turn, by opening contact 2 of relay K1, opens the ring circuit into the concentrator unit. By the transfer of the bottom armature of relay K1 from contact 8 to contact 9, the tip conductor from the concentrator is transferred from the path through the operating winding of relay K4 to the path through the ringing relay K2 in preparation for the next call incoming to the service board over the present trunk. The release of relay K1 also closes a possible locking ground for relay K3 through contact 1 of relay K3 and contact 7 of relay K1. The release of relay K1 by opening its contact 1 opens the ground connection for relays K4 and K5 and otherwise completely restores the circuit to normal.

A disconnect indication will be sent out from the concentrating unit on the automatic signaling master office trunk.

*Outgoing call*

A call may be originated by plugging the teletypewriter cord into the primary central office jack PRI CO for calling on an automatic signaling master office trunk to the primary central office or by plugging into the secondary central office trunk SEC CO for transmitting a call over an automatic signaling master office trunk to the secondary central office switching point. Selection of the central office is determined by the conditions applied to the ring conductor R of the subscriber line circuit to the concentrating unit to which the present trunk is connected. When the primary office is to be selected positive 130-volt battery through resistance R22 is connected to ring conductor R by the operation of relays K6 and K1 in sequence. When the secondary central office is to be selected, a momentary high resistance condition produced by resistances R22 and R23 in series is connected to the ring conductor R in response to the operation of relay K8 which responds to the connection of battery to the sleeve of jack SEC CO and in turn operates relay K7 over a circuit from ground through the contact of relay K8, contact 5 of relay K1 and the winding of relay K7. Relay K7 in turn operates relay K1. The operation of relay K1 establishes a circuit from battery through resistances R22 and R23 in series and through contact 1 of relay K9 to conductor R which extends over the subscriber line to the concentration unit. Relay K7 does not remain operated, but releases as soon after relay K1 operates as the slow-to-release characteristic of relay K7 will permit. Battery through resistances R22 and R23 will be applied to the ring conductor R only during the releasing time of relay K7. Relay K1 locks operated through its own contact 4 to ground on relay K8. Other contacts of relay K1 condition the tip lead T for transmission. In order to insure that the outgoing call will be over a particular automatic signaling master office trunk circuit, it is necessary to manipulate the make-busy feature of all other such trunks in the service board at the time a call for a particular trunk is made.

*Recall*

A recall indication may be sent over this trunk to the automatic signaling master office trunk by removing the teletypewriter cord from the jack which is being used in the present trunk for an interval of approximately 2 seconds. The relays in the present trunk function in the same manner as for a disconnect and then as for the origination of a new call.

*Use at concentrating unit*

When the subscriber line circuit to which this trunk circuit is connected must also be used with the test circuit associated with the line concentrating unit the key designated TB-CO, the ground lamp TB-GD and relay K9 are provided and connected as shown. The key is operated while the trunk is being used at the test position of the concentrating unit and should be released when the circuit is not in use.

The TB-GD lamp is a guard to indicate the use of the circuit at the service board or the operation of the TB-CO key. The operation of the key operates relay K9 and disconnects the tip and ring conductors T and R extending to the concentrating unit from the present trunk.

What is claimed is:

1. In a telegraph system, a trunk circuit, a polar transmitting relay in said trunk circuit, batteries connected to contacts on said relay responsive to first signals received by said trunk for transmitting current pulses as first telegraph signaling conditions to a first circuit connected on one side of said trunk, means including a potentiometer in said trunk responsive to second signals received by said trunk for changing the potential of a second circuit connected on the other side of said trunk substantially to repeat said second signals to said second circuit.

2. In a telegraph system, a trunk circuit having a first potentiometer, a second potentiometer, a relay winding, a rectifier, a circuit path extending from a first point in said first potentiometer through said winding and said rectifier to a second point in said second potentiometer and switching means for changing the potential of the junction between said winding and said rectifier to control the flow of current through said winding.

3. In a telegraph system, a trunk circuit, a polar relay therein, a winding on said relay, a first potentiometer, a dry rectifier, a second potentiometer, a first circuit path extending from a first point on said first potentiometer through said winding and said rectifier to a second point on said second potentiometer, a second circuit path extending from a third point between said rectifier and said winding to a switching means connectable to a connecting circuit and a third circuit extending from said second point to a switching means connectable to a connecting circuit.

4. In a telegraph system, a trunk circuit having a first and a second end, first means in said trunk circuit, comprising a potentiometer controlled signaling device, for receiving changes in potential conditions through said first end as telegraph signal impulses, second means in said circuit responsive to said changes in potential conditions for transmitting changes in current conditions through said second end as telegraph signal impulses.

5. In a telegraph system, a trunk circuit having a first and a second end, first means in said trunk circuit comprising a telegraph receiving device responsive to changes in current conditions for receiving changes in current conditions through said second end as telegraph signal impulses, second means in said circuit, comprising a potentiometer responsive to said changes in current conditions, for transmitting changes in potential conditions through said first end as telegraph signal impulses, to control a potential responsive telegraph signal receiving device.

References Cited in the file of this patent

UNITED STATES PATENTS

| Number | Name | Date |
|---|---|---|
| 2,557,943 | Clemens | June 26, 1951 |

FOREIGN PATENTS

| Number | Country | Date |
|---|---|---|
| 533,371 | Great Britain | Feb. 12, 1941 |